United States Patent
Sanders et al.

(10) Patent No.: US 7,362,443 B2
(45) Date of Patent: Apr. 22, 2008

(54) OPTICAL GYRO WITH FREE SPACE RESONATOR AND METHOD FOR SENSING INERTIAL ROTATION RATE

(75) Inventors: Glen A. Sanders, Scottsdale, AZ (US);
Grenville Hughes, Wayzata, MN (US);
Thomas Keyser, Plymouth, MN (US);
Lee K. Strandjord, Tonka Bay, MN (US)

(73) Assignee: Honeywell International Inc., Morristown, NJ (US)

( * ) Notice: Subject to any disclaimer, the term of this patent is extended or adjusted under 35 U.S.C. 154(b) by 141 days.

(21) Appl. No.: 11/282,229

(22) Filed: Nov. 17, 2005

(65) Prior Publication Data
US 2007/0109549 A1    May 17, 2007

(51) Int. Cl.
*G01C 19/72* (2006.01)
(52) U.S. Cl. ........................................ 356/470
(58) Field of Classification Search ................ 356/461, 356/470
See application file for complete search history.

(56) References Cited

U.S. PATENT DOCUMENTS

| | | | |
|---|---|---|---|
| 4,234,357 A | 11/1980 | Scheppele | |
| 4,315,693 A * | 2/1982 | Walker | 356/470 |
| 4,673,293 A * | 6/1987 | Sanders | 356/470 |
| 4,886,345 A | 12/1989 | Popek | |
| 4,958,898 A | 9/1990 | Friedman et al. | |
| 5,029,978 A | 7/1991 | Curtis et al. | |
| 5,090,810 A * | 2/1992 | Malvern | 356/461 |
| 5,143,577 A | 9/1992 | Haas et al. | |
| 5,163,118 A | 11/1992 | Lorenzo et al. | |
| 5,383,048 A | 1/1995 | Seaver | |
| 5,408,566 A | 4/1995 | Eda et al. | |
| 5,429,981 A | 7/1995 | Gardner et al. | |
| 5,500,544 A | 3/1996 | Park et al. | |
| 5,696,662 A | 12/1997 | Bauhahn | |
| 5,793,060 A | 8/1998 | Morikawa | |
| 5,841,931 A | 11/1998 | Foresi et al. | |

(Continued)

FOREIGN PATENT DOCUMENTS

GB    2355312 A1    4/2001

(Continued)

OTHER PUBLICATIONS

Ansheng Liu et al.; A high-speed silicon optical modulator based on metal-oxide-semiconductor capacitor, Nature, pp. 615-618, Feb. 12, 2004, vol. 427, Nature Publishing.

(Continued)

*Primary Examiner*—Samuel A. Turner
(74) *Attorney, Agent, or Firm*—Black Lowe & Graham, PLLC (57) ABSTRACT

Methods and apparatus are provided for a low cost optical gyro with a free space closed optical path. A ring resonator comprises a substrate and reflectors formed or placed on the substrate. The reflectors comprise a closed optical path and are configured to direct each of first and second light beams in a different counter-propagating direction in the closed optical path. Each of the first and second light beams frequencies are tuned to the resonance frequency of the resonator in the direction of propagation for which the light beam is circulating in the closed optical path.

18 Claims, 2 Drawing Sheets

U.S. PATENT DOCUMENTS

| | | |
|---|---|---|
| 5,861,651 A | 1/1999 | Brasen |
| 5,908,305 A | 6/1999 | Crampton et al. |
| 6,063,299 A | 5/2000 | Drake et al. |
| 6,108,212 A | 8/2000 | Lach et al. |
| 6,147,362 A | 11/2000 | Keyser |
| 6,150,266 A | 11/2000 | Lin et al. |
| 6,270,604 B1 | 8/2001 | McCallion et al. |
| 6,311,003 B1 | 10/2001 | Dubey et al. |
| 6,323,985 B1 | 11/2001 | Maloney |
| 6,372,609 B1 | 4/2002 | Aga et al. |
| 6,418,999 B1 | 7/2002 | Yanagita et al. |
| 6,493,089 B2 * | 12/2002 | Numai ........................ 356/461 |
| 6,493,502 B1 | 12/2002 | Deliwala |
| 6,526,187 B1 | 2/2003 | Deliwala |
| 6,546,538 B1 | 4/2003 | Rubdi et al. |
| 6,566,155 B1 | 5/2003 | Numai |
| 6,603,166 B2 | 8/2003 | Fechner et al. |
| 6,603,889 B2 | 8/2003 | Deliwala |
| 6,608,945 B2 | 8/2003 | Deliwala |
| 6,611,636 B2 | 8/2003 | Deliwala |
| 6,625,348 B2 | 9/2003 | Deliwala |
| 6,627,954 B1 | 9/2003 | Seefeldt |
| 6,646,747 B2 | 11/2003 | Deliwala |
| 6,654,511 B2 | 11/2003 | Deliwala |
| 6,656,747 B2 | 12/2003 | Sameshima |
| 6,658,173 B2 | 12/2003 | Deliwala |
| 6,671,443 B2 | 12/2003 | Deliwala |
| 6,690,844 B2 | 2/2004 | Deliwala |
| 6,690,863 B2 | 2/2004 | Deliwala |
| 6,693,225 B2 | 2/2004 | Boyer et al. |
| 6,738,546 B2 | 5/2004 | Deliwala |
| 6,748,125 B2 | 6/2004 | Deliwala |
| 6,760,498 B2 | 7/2004 | Deliwala |
| 6,816,636 B2 | 11/2004 | Cole et al. |
| 6,819,814 B2 | 11/2004 | Forrest et al. |
| 6,823,112 B2 | 11/2004 | Deliwala |
| 6,826,320 B2 | 11/2004 | Deliwala |
| 6,842,546 B2 | 1/2005 | Deliwala |
| 6,845,198 B2 | 1/2005 | Montgomery et al. |
| 6,850,683 B2 | 2/2005 | Lee et al. |
| 6,868,214 B1 | 3/2005 | Sakata et al. |
| 6,869,881 B2 | 3/2005 | Deliwala |
| 6,879,751 B2 | 4/2005 | Deliwala |
| 6,888,219 B2 | 5/2005 | Keyser |
| 6,890,450 B2 | 5/2005 | Naydenkrov et al. |
| 6,891,685 B2 | 5/2005 | Deliwala et al. |
| 6,891,985 B2 | 5/2005 | Delwala |
| 6,895,136 B2 | 5/2005 | Deliwala |
| 6,897,498 B2 | 5/2005 | Gothoskar et al. |
| 6,898,352 B2 | 5/2005 | Deliwala |
| 6,912,330 B2 | 6/2005 | Deliwala |
| 6,917,727 B2 | 7/2005 | Gunn, III et al. |
| 6,917,730 B2 | 7/2005 | Ghiron et al. |
| 6,919,238 B2 | 7/2005 | Bohr |
| 6,934,444 B2 | 8/2005 | Ghiron et al. |
| 6,944,369 B2 | 9/2005 | Deliwala |
| 6,947,615 B2 | 9/2005 | Deliwala |
| 6,963,118 B2 | 11/2005 | Deliwala et al. |
| 6,968,110 B2 | 11/2005 | Patel et al. |
| 6,980,720 B2 | 12/2005 | Gothoskar et al. |
| 6,987,910 B2 | 1/2006 | Shappir et al. |
| 6,993,225 B2 | 1/2006 | Patel et al. |
| 6,993,243 B2 | 1/2006 | Delwala |
| 7,000,207 B2 | 2/2006 | Gothoskar et al. |
| 7,003,196 B2 | 2/2006 | Ghiron et al. |
| 7,013,067 B2 | 3/2006 | Ghiron et al. |
| 7,020,364 B2 | 3/2006 | Ghiron et al. |
| 7,079,742 B1 | 7/2006 | Gunn, III et al. |
| 7,118,682 B2 | 10/2006 | Patel et al. |
| 7,149,388 B2 | 12/2006 | Keyser et al. |
| 7,177,489 B2 | 2/2007 | Keyser et al. |
| 7,217,584 B2 | 5/2007 | Yue et al. |
| 2002/0003650 A1 | 1/2002 | Usami et al. |
| 2002/0164143 A1 | 11/2002 | Csutak et al. |
| 2002/0172464 A1 | 11/2002 | Delwala |
| 2002/0185675 A1 | 12/2002 | Furukawa |
| 2003/0026571 A1 | 2/2003 | Bazylenko |
| 2003/0054639 A1 | 3/2003 | Deliwala |
| 2003/0059190 A1 | 3/2003 | Gunn, III et al. |
| 2003/0063364 A1 | 4/2003 | Kambe |
| 2003/0081924 A1 | 5/2003 | Yegnanarayanan |
| 2003/0098289 A1 | 5/2003 | Zheng et al. |
| 2003/0102079 A1 | 6/2003 | Kalvesten et al. |
| 2003/0151793 A1 | 8/2003 | Sugiyama et al. |
| 2003/0184950 A1 | 10/2003 | Nakamura |
| 2003/0207215 A1 | 11/2003 | Xu et al. |
| 2003/0223671 A1 | 12/2003 | Morse |
| 2004/0002197 A1 | 1/2004 | Fathimulla et al. |
| 2004/0021157 A1 | 2/2004 | Yue et al. |
| 2004/0126051 A1 | 7/2004 | Bruel |
| 2004/0151463 A1 | 8/2004 | Talin et al. |
| 2004/0223768 A1 | 11/2004 | Shastri et al. |
| 2004/0240822 A1 | 12/2004 | Patel et al. |
| 2004/0258347 A1 | 12/2004 | Gothoskar et al. |
| 2005/0094939 A1 | 5/2005 | Ghiron et al. |
| 2005/0110108 A1 | 5/2005 | Patel et al. |
| 2005/0123232 A1 | 6/2005 | Piede et al. |
| 2005/0123259 A1 | 6/2005 | Gunn, III et al. |
| 2005/0135727 A1 | 6/2005 | Piede et al. |
| 2005/0152658 A1 | 7/2005 | Keyser |
| 2005/0179986 A1 | 8/2005 | Gothoskar et al. |
| 2005/0189591 A1 | 9/2005 | Gothoskar et al. |
| 2005/0194990 A1 | 9/2005 | Gothoskar et al. |
| 2005/0207691 A1 | 9/2005 | Keyser et al. |
| 2005/0207704 A1 | 9/2005 | Keyser et al. |
| 2005/0213873 A1 | 9/2005 | Piede et al. |
| 2005/0214989 A1 | 9/2005 | Keyser |
| 2005/0220405 A1 | 10/2005 | Shappir et al. |
| 2005/0236619 A1 | 10/2005 | Patel et al. |
| 2005/0289490 A1 | 12/2005 | Shastri et al. |
| 2006/0018597 A1 | 1/2006 | Piede et al. |
| 2006/0038144 A1 | 2/2006 | Maddison |
| 2006/0063679 A1 | 3/2006 | Yue et al. |
| 2006/0083144 A1 | 4/2006 | Piede et al. |

FOREIGN PATENT DOCUMENTS

| | | |
|---|---|---|
| JP | 404154178 A * | 5/1992 |
| JP | 6029018 | 2/1994 |
| WO | 02069026 A2 | 9/2002 |
| WO | 03023468 A1 | 3/2003 |
| WO | WO03/077015 A1 | 9/2003 |
| WO | 2004088396 A2 | 10/2004 |

OTHER PUBLICATIONS

Ahmed et al., "Nitrided Thermal SiO2 for Thin Buried Gate Insulator in Dual Gate SOI-MOSFET", University/Government/Industry Microelectronics Symposium, 1999. Proceedings of the Thirteenth Biennial Minneapolis, MN Jun. 20-23, 1999, Piscataway, NJ, IEEE, Jun. 20, 1999, pp. 43-46.

Ahmed et al., "Nitrided Thermal SiO2 for Use as Top and Bottom Gate Insulators in Self-Aligned Double Gate Silicon-on-Insulator Metal-Oxide-Semiconductor Field Effect Transistor", Journal of Vacuum Science & Technology B (Microelectronics and Nanometer Structures) AIP for American Vacuum Soc., vol. 19, No. 3, May 2001, pp. 800-806.

Celler et al., "Smart Cut TM. A guide to the Technology, the Process, the Products", SOITEC, Jul. 2003, 1-8.

Celler et al., "Strained Silicon on Insulator. A quick Guide to the Technology, the Processes, the Products", SOITEC, Jul. 2003, 1-4.

Hilleringmann et al., "Optoelectronic System Integration on Silicon: Waveguides, Photodetectors, and VLSI CMOS Circuits on One Chip", IEEE Transactions on Electron Devices, 42 (1995) Mai, No. 5, New York, NY, US pp. 841-846.

Joshi et al., "Oxynitride Gate Dielectrics for p+ Polysilicon Gate MOS Devices", IEEE Electron Devices Letters, vol. 14, No. 12, Dec. 1993, pp. 560-562, XP000418671.

Ling Liao et al., "Optical Transmission Losses in Plycrystalline Silicon Strip Waveguides: Effects on Waveguide Dimensions, Thermal Treatment, Hydrogen Passivation, and Wavelength", Journal of Electronic Materials, vol. 29, No. 12, 2002, 1380.

Liu et al., "Fast Silicon Optical Modulator", Proc. Of the SPIE—Optoelectronic Integration on Silicon—Jul. 2004, vol. 5357, pp. 35-44.

Waldron et al., "Optical Modulator in Silicon-on-Insulator with a Low Thermal Signature", J. Vac. Sci. Thechnol. A 22(3) May/Jun. 2004, 2004 American Vacuum Society.

Png et al., "Development of Small Silicon Modulators in Silicon-on-Insulator (SOI)", Proceedings of the SPIE, SPIE, Bellingham, VA, vol. 4997, 2003, pp. 190-197.

Reed, G.T., et al., "Silicon on Insulator Optical Waveguides Formed by Direct Wafer Bonding", Materials Science and Engineering B, Elsevier Sequoia, Lausanne, Ch. vol. B15, No. 2, Nov. 1, 1992, pp. 156-159.

Samara-Rubio D., et al., "A Gigahertz Silicon-on-Insulator Mach-Zehnder Modulator", Optical Fiber Communication Conference, 2004. OFC 2004 Los Angeles, CA USA, Feb. 23-25, 2004, IEEE, Feb. 26, 2004, pp. 701-703, XP) 10745963.

Singh Jagar et al., "Design Methodology of the High Performance Large-Grain Polysilicon MOSFET", IEEE Transactions on Electron Devices, vol. 49, No. 5, May 2002, 795-801.

Sanders, Glen A., et al., System and Method for Stabilizing Light Sources In Resonator Gyro, Dec. 9, 2005, 37 pages, U.S. Appl. No. 11/298,439, USA.

Sanders, Glen A., et al., Hollow Core Fiber Optical Gyro, Jan. 6, 2006, 17 pages, U.S. Appl. No. 11/342,158, USA.

Hughes, Grenville., et al., Optical Resonator Gyro with External Cavity Beam Generator, Apr. 18, 2006, 21 pages, U.S. Appl. No. 11/406,939, USA.

* cited by examiner

OPTICAL GYRO WITH FREE SPACE RESONATOR AND METHOD FOR SENSING INERTIAL ROTATION RATE

FIELD OF THE INVENTION

The present invention generally relates to gyro systems, and more particularly relates to rotational sensors for use in navigation systems and attitude control.

BACKGROUND OF THE INVENTION

Gyros have been used to measure rotation rates or changes in angular velocity about an axis of rotation. A basic conventional fiber optic gyro (FOG) includes a light source, a beam generating device, and a coil of optical fiber coupled to the beam generating device that encircles an area. The beam generating device transmits light beams into the coil that propagate in a clockwise (CW) direction and a counter-clockwise (CCW) direction along the core of the optical fiber. Many FOGs utilize glass-based optical fibers that conduct light along a solid glass core of the fiber. The two counter-propagating (e.g., CW and CCW) beams experience different pathlengths while propagating around a rotating closed optical path, and the difference in the two pathlengths is proportional to the rotational rate.

In a resonator fiber optic gyro (RFOG), the counter-propagating light beams are desirably monochromatic (e.g., in a single frequency) and circulate through multiple turns of the fiber optic coil and for multiple passes through the coil using a device that redirects light that has passed through the coil back into the coil again (i.e., circulates the light) such as a fiber coupler. The beam generating device modulates and/or shifts the frequencies of each of the counter-propagating light beams so that the resonance frequencies of the resonant coil may be observed. The resonance frequencies for each of the CW and CCW paths through the coil are based on a constructive interference condition such that all light-waves having traversed the coil a different number of times interfere constructively at any point in the coil. As a result of this constructive interference, an optical wave having a wavelength λ is referred to as "on resonance" when the round trip resonator pathlength is equal to an integral number of wavelengths. A rotation of the coil produces a different pathlength for clockwise and counterclockwise propagation, thus producing a shift between the respective resonance frequencies of the resonator, and the frequency difference, such as may be measured by tuning the CW beam and CCW beam frequencies to match the resonance frequency shift of the closed optical path due to rotation, indicates the rotation rate.

In the RFOG, the glass material of the optical fiber may shift the resonance frequencies of the CW and CCW paths and thus produce a false indication of rotation or inaccurate measurement of rotation rate. A reflective mirror may be used to circulate the counter-propagating light beams in the coil multiple times but this typically reduces the signal-to-noise ratio from losses generated at the transition from the mirror to the coil. Additional anomalies that decrease the accuracy of the measurement of the rotational rate may be generated from a non-linear Kerr effect, stimulated Brillouin scattering, and polarization errors. These error mechanisms are also sensitive to the environment which, for example, gives rise to unwanted temperature sensitivity.

The non-linear Kerr effect occurs when high monochromatic light power inside the RFOG alters the index of refraction of the glass in the optical fiber. A mismatch of intensities of the CW and CCW beams may induce a bias on the observed frequency shifts on the order of several degrees/hour. Stimulated Brillioun scattering (SBS) occurs when a high intensity associated with a high finesse in the fiber resonator causes lasing or stimulated emission in the glass fiber, and this generally promotes large instabilities in the measurement of the resonance frequencies. Polarization-induced errors may result from fiber couplers that incidentally couple light into a second polarization mode, either from one optical fiber to an adjacent optical fiber or within the same fiber. The second polarization mode may resonate to produce an asymmetry in the resonance lineshape of the polarization mode used to measure a rotation. Even though the frequency of the second polarization mode is the same for the CW and CCW beams, the amplitude may be different, thus causing different observations, beyond the affect of rotation, of the resonance frequencies of the CW and CCW beams. Polarization-induced errors may severely limit the accuracy of the RFOG because determination of the resonance centers for each of the resonance frequencies of the CW and CCW beams directly affects the rotational rate measurement.

In addition to encountering error mechanisms that may affect accuracy, the conventional RFOG may be cost prohibitive for high volume production, particularly for a smaller scale RFOG. The conventional RFOG is an assembly of multiple components (e.g., light source, beam generator, coil, etc.) that has an associated cost for each component and for assembling such components. For smaller scale applications, the cost associated with assembling the RFOG generally increases with the increased cost for miniaturizing each component and aligning the miniaturized optical components.

Accordingly, it is desirable to provide a high grade optical gyro having a lower cost and suitable for high volume production. More particularly, it is desirable to provide a low cost optical gyro that minimizes inaccuracies due to non-linear Kerr effect, stimulated Brillouin scattering, polarization errors, and bend losses associated with fiber resonator gyros based on conventional optical fiber. In addition, it is desirable to provide a method for sensing a rotational rate of an optical gyro that reduces the effect of error mechanisms that decrease the accuracy of the measurement of the rotational rate. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

Methods and apparatus are provided for sensing a rotational rate of a ring resonator about an axis using a resonator with a free space light path of either air or vacuum. In an exemplary embodiment, a ring resonator comprises a substrate and a set of reflective surfaces on the substrate and comprising a closed optical path. The set of reflective surfaces is configured to direct each of the first and second light beams in a different counter-propagating direction in the closed optical path. Each of the first and second light beams has a resonance frequency when circulating in the closed optical path.

In another exemplary embodiment, an optical gyro comprises at least one substrate, a beam generator on the substrate and configured to produce first and second light beams, a set of reflective surfaces on the substrate and comprising a closed optical path, a sensor on the substrate and configured to detect a first resonance frequency of a first counter-propagating direction and a second resonance frequency of a second counter-propagating direction, and a processor coupled to the sensor and configured to determine a rotational rate of the optical gyro based on a difference between the first resonance frequency and the second resonance frequency. The set of reflective surfaces configured to circulate a portion of each of the first and second light beams in a different counter-propagating direction of the closed optical path. Each of the portions of the first and second light beams having a resonance frequency when circulating in the closed optical path.

In another exemplary embodiment, a method for sensing a rotation rate of a ring resonator formed on a substrate is provided. The method comprises the steps of circulating first and second counter-propagating light beams along a closed optical path through a free space with a set of reflectors on the substrate, producing a first resonance frequency of a first counter-propagating direction of light propagation in the ring resonator, producing a second resonance frequency of a second counter-propagating direction of light propagation in the ring resonator, and measuring a frequency shift between the first resonance frequency and the second resonance frequency. The frequency shift indicates the rotation rate.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
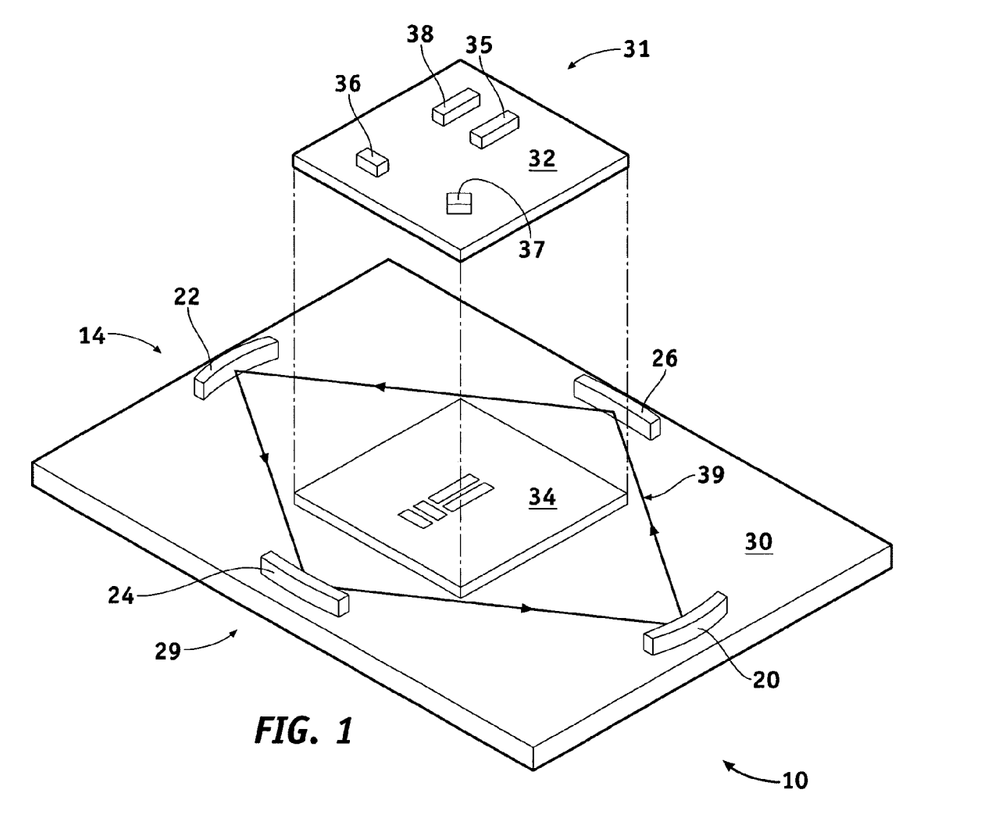
FIG. 1 is an exploded view of an optical gyro in accordance with an exemplary embodiment of the present invention.

Referring now to the drawings, FIG. 1 is an exploded view of an optical gyro 10 in accordance with an exemplary embodiment of the present invention. The optical gyro 10 comprises a first substrate 30, a resonator 14 formed on the first substrate 30 and having a closed optical path 39, a signal processing electronics 34 (e.g., a signal processor) formed on the first substrate 30, and a second substrate 32 coupled to the signal processing electronics. The first substrate 30, resonator 14, and signal processing electronics 34 are collectively referred to as a first optical bench 29. The substrates 30, 32 may be silicon, silicon-on-insulator, or the like. Using miniature optical bench techniques, a variety of precision optical structures may be etched or formed on the surface of the substrates 30, 32 to be integrated with the substrates 30, 32. Additionally, external optical components may be precisely mounted on the surfaces of the substrates 30, 32 or formed on the substrates 30, 32 or on additional material layers above a base layer of the substrates 30, 32. Each of the components of the optical gyro 10 may be integrated into or onto the substrates 30, 32 (e.g., by etching or forming on the substrates 30, 32) or formed onto or mounted onto the substrates 30, 32. For simplicity of discussion, the term substrate includes additional material layers that may be formed above the base layer of the substrate.

A second optical bench 31 is based on the second substrate 32 and includes, but is not necessarily limited to, the second substrate 32, a laser 38 that generates a light beam, miniature optical elements 36, 37 (e.g., mirror-reflectors) that produce two light beams from the light beam received from the laser 38 and directs the two light beams to the resonator 14, and an optical sensor 35. The second optical bench 31 may include other optical elements and waveguides, including by way of example and not limitation, optical elements that further direct light beams between the resonator 14 and the components (e.g., the optical sensor 35) of the second optical bench 31. In an alternative embodiment, some or all of the functions incorporated on the second optical bench 31 may be mounted or formed directly on the first substrate 30 thus combining the first and second optical benches onto a single substrate.

After receiving the light beams from the miniature optical elements 36, 37, the resonator 14 directs the two light beams in counter-propagating directions (e.g., a clockwise (CW) direction and a counter-clockwise (CCW) direction) along the closed optical path 39 to encompass an area, described in greater detail below. By application of the Sagnac Effect, the optical gyro 10 senses a rotation rate about an axis of the optical gyro 10. For example, the optical sensor 35 detects the resonance centers of the resonance lineshapes for the CW and CCW light beams, and a processor on the signal processing electronics platform 34 determines the resonance frequencies associated with each of the counter-propagating directions of the resonator 14 based on the frequency shift between the detected resonance centers to determine the rotation rate of the optical gyro 10.

In an exemplary embodiment, the resonator 14 comprises four reflectors 20, 22, 24, and 26 that are either etched into the substrate 30 or placed on the substrate 30 in a rectangular configuration that encloses an area. The path of light beams between the reflectors 20, 22, 24, and 26 is free space, either vacuum or air or a gas, such that the index of refraction experienced by the light between the reflectors 20, 22, 24, and 26 is substantially unity. Although the resonator 14 is shown and described with four reflectors, the resonator 14 may comprise three or more reflectors that direct each of the counter-propagating light beams along the closed optical path 39. Each of the reflectors 20, 22, 24, and 26 has highly reflective coatings for directing the light beams along the closed optical path 39. For example, the resonator 14 directs the first light beam in a CCW direction along the closed optical path 39 by receiving the first light beam and directing the first light beam from the reflector 24 to the reflector 20 to the reflector 26 to the reflector 22 and back to the reflector 24. The resonator 14 also directs the second light beam in a CW direction along the closed optical path 39 by receiving the second light beam and directing the second light beam from the reflector 24 to the reflector 22 to the reflector 26 to the reflector 20 and back to the reflector 24. In between each of the reflectors 20, 22, 24, and 26, along the closed optical path 39, the light beams propagate in a free space, thus the resonator 14 directs the counter-propagating light beams along the closed optical path 39 in the free space.

By etching, forming, or placing the reflectors 20, 22, 24, and 26 and the beam path between the reflectors 20, 22, 24, and 26 forming the resonator 14 on the surface of the first substrate 30 and incorporating the laser 38 and miniature optical elements 36, 37 on the second optical bench 31 and the signal processing electronics 34 in the first substrate 30, a substantially small, low cost silicon optical gyro may be manufactured that is ideal for high volume production. Although the substrate and material system is preferably silicon, other materials (e.g., alumina, nitrides, III-V elements, other refractory materials, and the like) having suitable properties may be utilized for the substrate.

Figure 2:
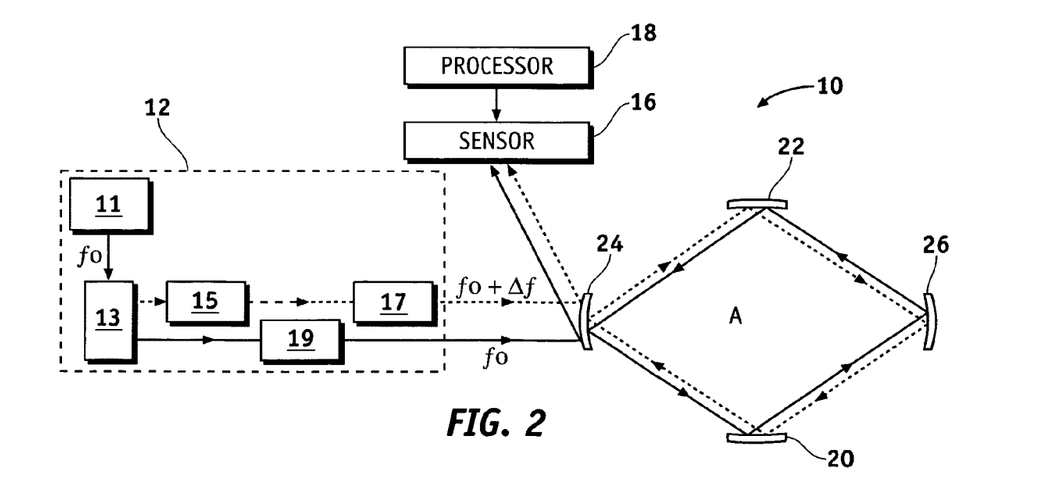
FIG. 2 is a block diagram of an optical gyro in accordance with an exemplary embodiment of the present invention.

FIG. 2 is a block diagram of an optical gyro 10 in accordance with an exemplary embodiment of the present invention. The optical gyro 10 comprises the resonator 14 shown in FIG. 1, and further comprises a beam generator 12, an optical sensor 16 and a processor 18 (e.g., residing on the signal processing electronics platform 34, which can be in the first substrate 30 or in a separate substrate mounted on the first substrate 30 shown in FIG. 1) coupled to the optical sensor 16. The beam generator 12 produces the light beams that propagate along the closed optical path 39 in counter-propagating directions (e.g., CW and CCW directions). In an exemplary embodiment, the beam generator 12 comprises a tunable light source 11 (e.g., a laser) that generates a light beam having a frequency $f_0$, a beam splitter 13 that receives the light beam from the light source 11 and divides the light beam from the light source into first and second light beams (e.g., a CCW propagating light beam and a CW propagating light beam), a first wave modulator 15 that receives the first light beam from the beam splitter 13 and modulates the first light beam, a second wave modulator 19 that receives the second light beam from the beam splitter 13 and modulates the second light beam, and a frequency shifter 17 that receives the first modulated light beam from the first wave modulator 15 and shifts the frequency of the first modulated light beam. The light source 11 is a single frequency tunable laser having frequency stability, substantially narrow line width, and relatively high power capability. The wave modulators 15, 19 frequency-modulate the first and second light beams such as by introducing a sinusoidal waveform into the light beams, and the particular modulation may be selected to improve sensitivity of the optical gyro 10 to a detected frequency shift ($\Delta f$), described in greater detail hereinbelow. The first modulated light beam and second modulated light beam are introduced to the resonator 14 to propagate in a CCW and a CW direction, respectively.

In another exemplary embodiment, the beam generator 12 includes first and second tunable lasers that each synthesize the CCW and CW light beams, respectively, and introduce the light beams into the resonator 14. In this exemplary embodiment, the light beam produced by the first laser is tuned to the frequency $f_0$, and the light beam produced by the second laser is tuned to a frequency $f_0+\Delta f$ thereby replacing the frequency shifter 17. In this example, the relative frequency drift and jitter between the two laser frequencies should be substantially minimized to a level that minimizes or does not affect the accuracy and stability of the frequency shift, and thus rotational rate, measurement. This can be accomplished by laser frequency stabilization techniques, such as those that use electronic servos to lock their beat frequencies to a tunable stable offset (proportional to rotational rate). The beam generator 12 preferably has direct source modulation, such as having each of the two lasers sinusoidally frequency modulate the respective frequencies thereby replacing the wave modulators 15, 19.

For rotation sensing, the frequency $f_0$ of the CCW beam is tuned (e.g., by tuning the frequency of the laser 11) to the resonance frequency of the resonator 14 in the CCW direction. The frequency shifter 17 tunes the frequency $\Delta f$ to align the CCW beam frequency with a resonance center relative to the resonance frequency of the resonator 14 in CCW direction. During rotation sensing, the frequency shifter 17 shifts the frequency of the light from the laser 11 by an amount $\Delta f$ and directs the frequency shifted light to the resonator 14 in the CW direction. Two methods of accomplishing a frequency shift include the use of an acousto-optic frequency shifter and the use of a phase modulator with a serrodyne modulation waveform. In the former method, the acoustic-optic frequency shifter may be an acousto-optic device formed or placed onto the first substrate 30. In the latter method, the beam from the laser 11 is introduced into a waveguide formed on the substrate and phase modulated with a serrodyne signal. The serrodyne waveform is a form of a sawtooth waveform. To apply a relatively pure frequency shift, the phase shift amplitude of the sawtooth waveform, described in greater detail hereinafter, is set to an integer multiple of $2\pi$ and the sawtooth waveform has a substantially fast flyback time when compared to its period.

To measure the resonance center-frequencies of the closed optical path 39, in either the CW direction or CCW direction, a standard synchronous detection technique is used. Each input light beam (e.g., CW beam and CCW beam) is sinusoidally phase-modulated, and therefore frequency modulated at frequencies $f_m$ and $f_n$, respectively, to dither each input beam frequency across a resonance lineshape as measured by the optical sensor 16. For example, additional circuitry coupled to the optical sensor 16 may demodulate the output of the optical sensor 16 at frequencies $f_m$ and $f_n$, respectively, to measure resonance centers indicated by the light outputs of the CW and CCW beams. At a line center of the resonance lineshape, or the resonance center, the optical sensor 16 detects a minimum output at the fundamental frequencies $f_m$ and $f_n$, respectively. When the input beam frequency (e.g., $f_0+\Delta f$ or $f_0$) is off-resonance, an error signal at frequencies $f_m$ and $f_n$, respectively, is sensed by the optical sensor 16 and used to tune the respective beam frequency to the respective resonance frequency of the resonator 14. The frequency of the CCW beam is tuned by changing the frequency of the laser, $f_0$, and the frequency of the CW beam is adjusted via a feedback loop that changes the frequency shift of the frequency shifter, $\Delta f$, so that $f_0+\Delta f$ matches the CW resonance frequency of the resonator 14.

When $f_0+\Delta f$ is tuned away from the resonance frequency of the resonator 14 in the CW direction, the energy from the CW beam does not produce a maximum intensity at the optical sensor 16. When $f_0+\Delta f$ is tuned at the resonance frequency of the resonator 14 in the CW direction, the CW beam has a minimum output, i.e., a resonance dip, thereby indicating the resonance center. Similarly for the CCW light beam, the energy of the CCW beam enters the closed optical path 39 when the CCW beam is tuned to the resonance frequency of the resonator 14 in the CCW direction.

In the absence of rotation, the round-trip path-lengths of the CW and CCW beams inside the resonator 14 in the CW and CCW direction, respectively, are substantially equal. Thus, $\Delta f$ is tuned to zero by the frequency shifter 17. In the presence of rotation, the round-trip path-lengths differ between the CW and the CCW directions producing a resonance frequency difference between the two directions that is proportional to the rotation rate. By tuning the frequency $f_0$ to track the CCW resonance and the frequency $\Delta f$ to track the CW resonance center, the rotation rate is determined. In an exemplary embodiment, the processor 18 determines the rotation rate based on the resonance frequency difference between the two directions of the closed optical path 39 of the resonator 14.

In a preferred exemplary embodiment of optical gyro 10, frequency shifting is obtained using a serrodyne method whereby a phase ramp is applied to an input light beam (e.g., CW and CCW beams). By driving a phase modulator, such as the wave modulators 15, 19, with a continuous and linear phase ramp, a frequency shift may be obtained, that is proportional to the slope of the phase ramp. A sawtooth waveform having a $2\pi$ phase height and a frequency $\Delta f$ produces substantially equivalent results as the continuous ramp, and the sawtooth frequency ($\Delta f$) is adjusted to track the CW resonance in the presence of rotation. As previously mentioned, the frequency shifter 17 may apply a relatively pure frequency shift when the sawtooth waveform flyback time is substantially fast compared to the waveform period.

Light introduced to the resonator 14 traverses through free space (e.g., air or a vacuum). Because the light energy traverses through free space along the closed optical path of the resonator 14 and high reflectivity laser mirrors may be used for the reflectors 20, 22, 24, and 26 thus providing low loss and attractive polarization properties to circulate light within the resonator 14. The resonator 14 is suited to significantly attenuate, or eliminate altogether, the rotation measurement errors commonly associated with the properties of the glass medium in the core of conventional fibers.

Figure 3:
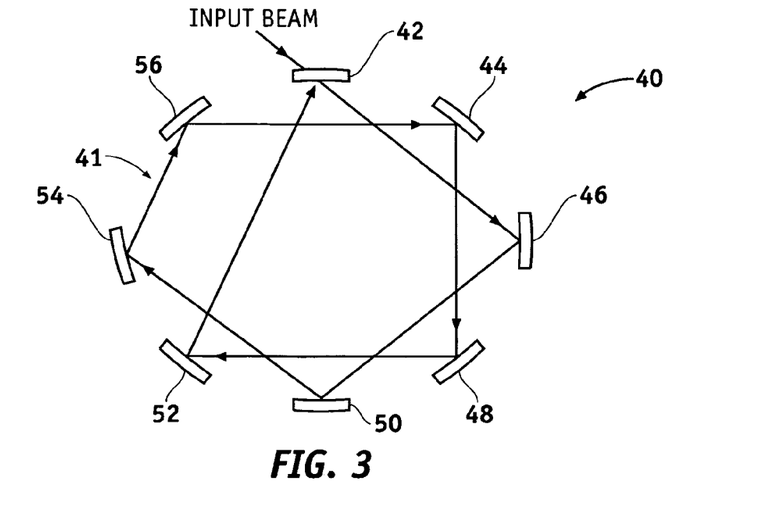
FIG. 3 is a schematic diagram of a resonator in accordance with one exemplary embodiment.

FIG. 3 is a schematic diagram of a resonator 40 encircling an effective area (A) in accordance with one exemplary embodiment of the present invention. The resonator 40 comprises a plurality of reflective elements 42, 44, 46, 48, 50, 52, 54, 56 that together direct an input light beam (e.g., CW light beam or CCW light beam) from the beam generator 12 (FIG. 2) along a closed optical path 41 around the effective area A. A first set of reflectors 46, 50, 54, and 56 directs the light beam for a first loop, and a second set of reflectors 44, 48, 52, and 42 directs the light beam for a second loop, thus traveling around the equivalent area A twice. The closed optical path 41 preferably includes 2 or more loops and encloses an area such that the gyro 10 is sensitive to rotation via the Sagnac effect. Additionally, the term loop refers to the path the counter-propagating light beam follows such that the Poynting vector of the counter-propagating light beam changes its direction by greater than 180 degrees in absolute value. For example, the first loop comprises the propagation of the light beam from the reflector 42 to the reflector 46 to the reflector 50 to the reflector 54 and to the reflector 56, and the second loop comprises the propagation of the light beam from the reflector 56 to the reflector 44 to the reflector 48 to the reflector 52 and to the reflector 42.

In this exemplary embodiment, the number of reflectors of the resonator 40 is increased, compared with the resonator 14 shown in FIG. 2, to encircle the effective area A during a single traversal along the closed optical path 41 to thereby increase the resonator pathlength and thus, increase the signal-to-noise ratio of the optical gyro. The path length of the closed optical path is increased while substantially preserving the area A encircled by the light beam in the case of fewer reflectors, such as shown in FIG. 2. Additional reflectors or reflective surfaces may be added to further increase the path length of the closed optical path of the resonator 40.

Figure 4:
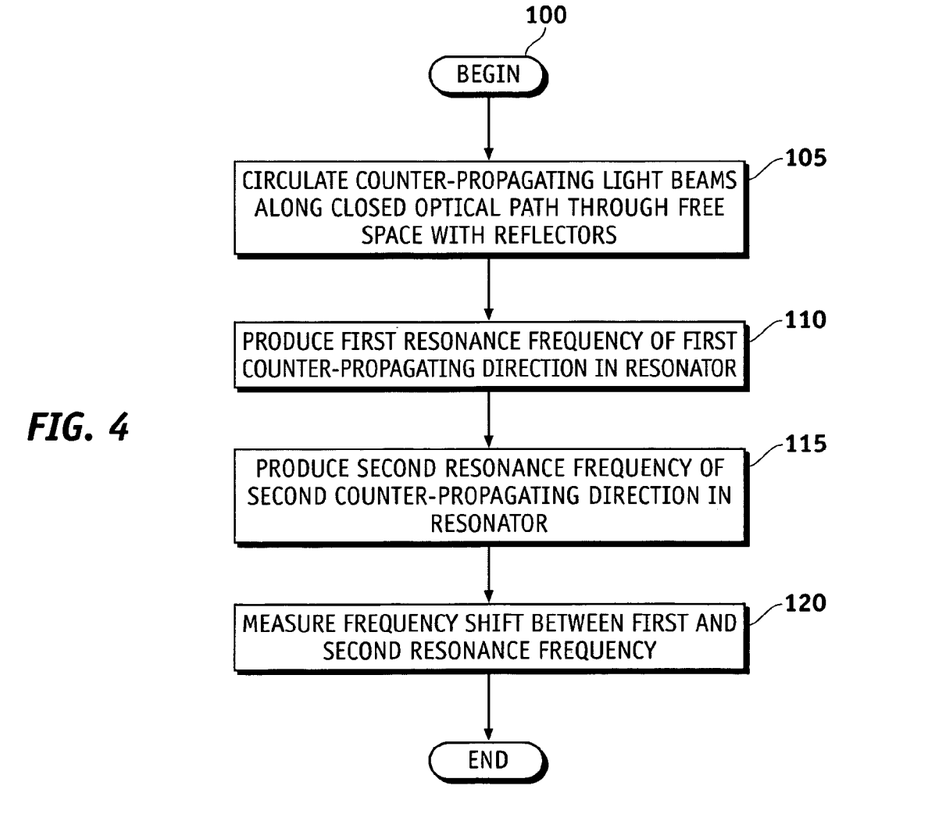
FIG. 4 is a flow diagram of a method for sensing a rotation rate of a ring resonator in accordance with an exemplary embodiment of the present invention.

FIG. 4 is a flow diagram of a method for sensing a rotation rate of a ring resonator in accordance with an exemplary embodiment of the present invention. The method begins at step 100. Referring to FIGS. 1 and 4, CW and CCW light beams are circulated around the closed optical path 39 of the resonator 14 at step 105. The resonator 14 circulates the counter-propagating light beams through free space from one reflector to the next reflector along the closed optical path 39. A first resonance line shape corresponding to the CW direction of the resonator 14 is produced by introducing the CW light beam into the resonator at step 110 and detected by the optical sensor 37. A second resonance line shape corresponding to the CCW direction of the resonator 14 is produced by introducing the CCW light beam into the resonator at step 115 and detected by the optical sensor 37. The signal processing electronics 34 determines the resonance frequencies for the CW and CCW direction of light propagation in the resonator 14 and determines any frequency shift between the resonance frequency of the CW direction of light propagation in the resonator 14 and the resonance frequency of the CCW direction of light propagation in the resonator 14 at step 120, and this frequency shift indicates the rotation rate of the ring resonator.

Advantages of the optical gyro 10 include, but are not limited to: a capability of providing about a 1 deg/hr bias and about a 0.1 deg/root-hr angle random walk (ARW) in a low-cost, small-sized package; a resonator having a very low loss; use of a high reflectivity mirror rather than an optical coupler using waveguides to circulate light in the ring resonator; a compact, stable laser component that can be mounted on a silicon optical bench or an optical bench using a different substrate material; ease of coupling light from the source to the resonator; ease of interfacing to signal processing electronics in the same platform as the optics or ease of integration and electronics in the same platform; elimination of non-linear effects in silica fibers or other waveguide materials that may promote gyro errors; substantial reduction of light loss at transition point to resonator 14; a capability of circulating the light beams in very tight (e.g., pencil diameter) loops with little to no change in light transmission properties.

In one exemplary embodiment, the optical gyro 10 is constructed on a silicon-based micro-optical bench or the optical gyro 10 is constructed with a silicon-on-insulator electro-optical circuit that integrates electronics and optics and provides an efficient, expedient, self-aligned, and mechanically stable interface between the two. Optical functions, such as associated with the splitter 13 and the wave modulators 15, 19, may be incorporated in waveguides located close to the surface of the optical bench or formed in the thin silicon film. Since the optical and electrical characteristics of the silicon film are compatible, signal processing circuitry and optical sensing elements can also be integrated into the silicon layer, and miniature optical components having a feature size of as little as 10 microns may be mounted on silicon surfaces to eliminate large bulk optics, even when the light wave is needed to travel in free space instead of in a waveguide, such as in the resonator path itself. Laser diodes and external elements for stabilizing their frequency may also be mounted on the top surface of the silicon optical bench. In this exemplary embodiment, the laser and related frequency tuning components may be mounted on the optical bench, and using the serrodyne method for frequency shifting enables the use of an integrated optical phase modulator in a silicon waveguide for the frequency shifter. A micro-electromechanical system (MEMS) optical prism may be used as a highly refractive laser prism capable of directing light into and out of the silicon waveguides from the laser or free space optics. Other ways of coupling light from free space optics to waveguides may be incorporated, such as the use of tapered or graded index structures that adiabatically couple light into the waveguide, or the use of gratings. The use of these techniques allows the fabrication of optics in a silicon platform and thus integrated with the electronics.

The optical gyro 10 is suited to a variety of applications including, by way of example and not of limitation, applications requiring inertial guidance such as aircraft, land vehicle, submarine, satellite, surface ship navigation, and the like. In addition, the relatively small size envisioned for the optical gyro 10 would enable a practical usage on very small platforms including, by way of example and not of limitation, small robots, individual soldier footwear, and small-scale satellites.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A ring resonator for circulating first and second light beams, the ring resonator comprising:
   a substrate; and
   a set of reflective surfaces on said substrate and comprising a closed optical path, said set of reflective surfaces configured to direct each of the first and second light beams in a counter-propagating direction in said closed optical path, each of the first and second light beams having a resonance frequency when circulating in said closed optical path, where in said closed optical path encircles a surface area and comprises at least two loops, and wherein said set of reflective surfaces is configured to:
   direct the first light beam in a first counter-propagating direction along said closed optical path; and
   direct the second light beam in a second counter-propagating direction along said closed optical path.

2. A ring resonator according to claim 1, wherein said set of reflective surfaces comprises a plurality of mirror-reflectors on said substrate, each of said plurality of mirror-reflectors configured to direct the first and second light beams along said closed optical path through a free space.

3. A ring resonator according to claim 1, wherein said set of reflective surfaces comprises a plurality of mirror-reflectors on said substrate, a first subset of said plurality of mirror-reflectors configured to direct each of the first and second light beams along said closed optical path for a first loop, and a second subset of said plurality of mirror-reflectors configured to direct each of the first and second light beams along said closed optical path for a second loop.

4. A ring resonator according to claim 1, wherein said resonance frequency of said first light beam indicates a resonance frequency of a first counter-propagating direction and said resonance frequency of said second light beam indicates a resonance frequency of a second counter-propagating direction, and wherein a difference between said resonance frequency of said first counter-propagating direction and said resonance frequency of said second counter-propagating direction is proportional to a rotation rate of the ring resonator.

5. A ring resonator according to claim 1, wherein said substrate is selected from at least one of a silicon substrate and a silicon-on-insulator substrate.

6. A ring resonator according to claim 1, wherein said set of reflectors is formed by an etching process on said substrate and wherein said set of reflectors comprises high reflectivity coatings.

7. An optical gyro comprising:
   at least one substrate;
   a beam generator on said at least one substrate and configured to produce first and second light beams;
   a set of reflective surfaces on said at least one substrate and comprising a closed optical path, said set of reflective surfaces configured to circulate a portion of each of said first and second light beams in a different counter-propagating direction of said closed optical path, each of said portions of said first and second light beams having a resonance frequency when circulating in said closed optical path, the closed optical encircling a surface and having at least two loops;
   a sensor on said at least one substrate and configured to detect a first resonance frequency of said first counter-propagating direction and a second resonance frequency of said second counter-propagating direction; and
   a processor coupled to said sensor and configured to determine a rotational rate of the optical gyro based on a difference between said first resonance frequency and said second resonance frequency.

8. An optical gyro according to claim 7, wherein said beam generator comprises at least one laser configured to produce said first and second light beams, each of said first and second light beams having a predetermined frequency.

9. An optical gyro according to claim 8, wherein said beam generator comprises a frequency shifter coupled to said at least one laser, said frequency shifter configured to frequency shift one of said first and second light beams.

10. An optical gyro according to claim 9, wherein said frequency shifter comprises an acousto-optic crystal on said at least one substrate and coupled to a first laser.

11. An optical gyro according to claim 9, wherein said frequency shifter comprises a waveguide coupled to a first laser, said waveguide configured to phase modulate one of said first and second light beams with a serrodyne signal.

12. An optical gyro according to claim 7 further comprising:
   at least one output mirror on said at least one substrate and configured to direct a portion of light output from said closed optical path to said sensor; and
   at least one input mirror on said at least one substrate and configured to direct said portions of said first and second light beams from said beam generator to said closed optical path.

13. An optical gyro according to claim 7 further comprising:
   at least one output index-guided waveguide formed within said at least one substrate and configured to direct a light output from said closed optical path to said sensor; and
   at least one input index-guided waveguide formed within said at least one substrate and configured to direct said first and second light beams from said beam generator to said closed optical path.

14. An optical gyro according to claim 7, wherein said set of refleciive surfaces comprises a plurality of mirror-reflectors on said at least one substrate, each of said plurality of mirror-reflectors configured to direct said first and second light beams along said closed optical path through said free space.

15. An optical gyro according to claim 7, wherein said at least one substrate is selected from at least one of a silicon substrate and a silicon-on-insulator substrate.

16. A method for sensing a rotation rate of a ring resonator formed on a substrate, the method comprising the steps of:
   circulating first and second counter-propagating light beams along a closed optical path through a free space with a set of reflective surfaces on the substrate
   wherein said circulating includes directing each of the first and second counter-propagating light beams with a first set of mirror-reflectors along the closed optical path for a first loop and directing each of the first and second counter-propagating light beams with a second set of mirror-reflectors along the closed optical path for a second loop;
   producing a first resonance frequency of a first counter-propagating direction of light propagation in the ring resonator;
   producing a second resonance frequency of a second counter-propagating direction of light propagation in the ring resonator; and
   measuring a frequency shift between the first resonance frequency and the second resonance frequency, the frequency shift indicating the rotation rate.

17. A method according to claim 16, wherein said circulating step comprises reflecting the first and second counter-propagating light beams along the closed optical path with a plurality of mirror-reflectors on the substrate.

18. A method according to claim 16 further comprising the steps of:
   forming the first and second counter-propagating light beams from at least one laser;
   frequency shifting a frequency of the first counter-propagating light beam by a predetermined frequency from a frequency of the second counter-propagating light beam.

* * * * *

UNITED STATES PATENT AND TRADEMARK OFFICE
CERTIFICATE OF CORRECTION

PATENT NO. : 7,362,443 B2
APPLICATION NO. : 11/282229
DATED : April 22, 2008
INVENTOR(S) : Sanders et al.

Page 1 of 1

It is certified that error appears in the above-identified patent and that said Letters Patent is hereby corrected as shown below:

In Claim 14. "reflectiive" should be spelled --reflective--

Signed and Sealed this

Nineteenth Day of August, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,362,443 B2 | Page 1 of 1 |
| APPLICATION NO. | : 11/282229 | |
| DATED | : April 22, 2008 | |
| INVENTOR(S) | : Sanders et al. | |

It is certified that error appears in the above-identified patent and that said Letters Patent is hereby corrected as shown below:

Column 11, in Claim 14, line 2, "reflectiive" should be spelled --reflective--

This certificate supersedes the Certificate of Correction issued August 19, 2008.

Signed and Sealed this

Sixteenth Day of September, 2008

JON W. DUDAS
*Director of the United States Patent and Trademark Office*